(No Model.)
T. G. WALKER.
PROCESS OF DRYING.
No. 347,846. Patented Aug. 24, 1886.
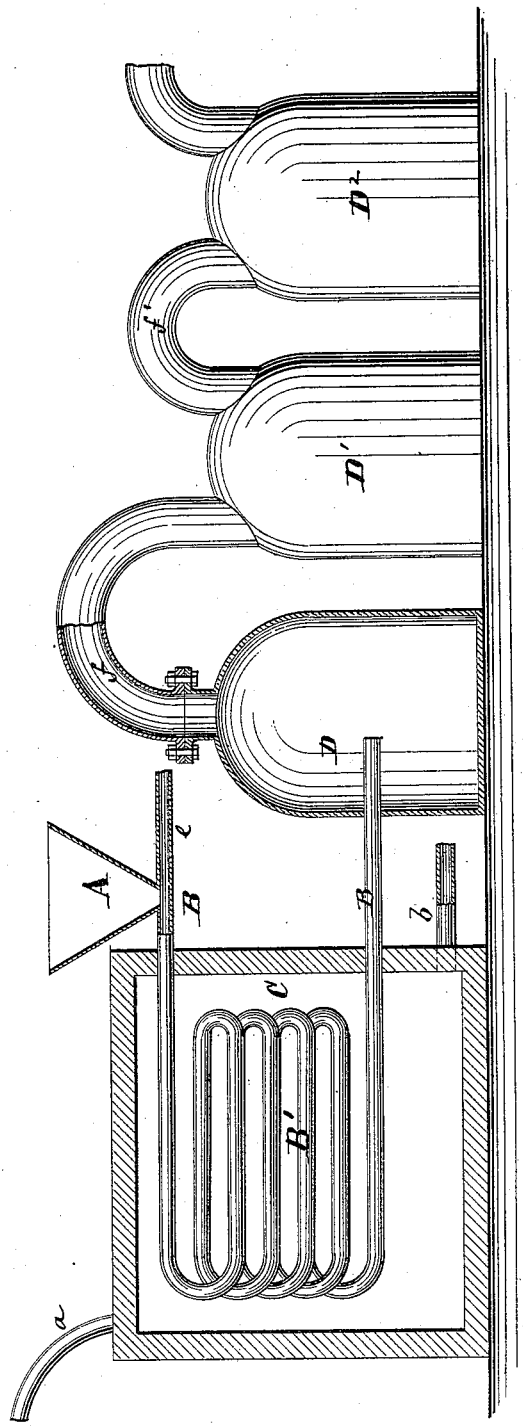
WITNESSES:
A. Schehl.
John M. Speer.
INVENTOR
Thomas Geo. Walker.
BY Briesen & Steele
ATTORNEYS.

UNITED STATES PATENT OFFICE.

THOMAS GEORGE WALKER, OF MORRISTOWN, NEW JERSEY.

PROCESS OF DRYING.

SPECIFICATION forming part of Letters Patent No. 347,846, dated August 24, 1886.

Application filed October 7, 1885. Serial No. 179,212. (No model.)

*To all whom it may concern:*

Be it known that I, THOMAS GEORGE WALKER, a resident of Morristown, in the county of Morris and State of New Jersey, have invented an Improved Process of Drying Animal and other Substances, of which the following is a full, clear, and exact description, reference being made to the accompanying drawing.

This invention relates to improvements on the drying process described in Letters Patent No. 285,187, of September 18, 1883. In that patent I described the treatment of tankage and the like in the presence of air and steam. I have found, however, that certain substances are apt to cake together under the influence of the moisture of the steam, and that, therefore, the use of steam upon such substances is objectionable. The class of substances to which I refer are mealy substances of all kinds; but the present invention, which consists in treating the articles to be dried in the presence of air only, said air carrying the substances through a long heated coil, is applicable to all other articles to be dried—such as tankage and the like.

The drawing represents a sectional elevation of the apparatus I employ. In it the letter A represents a hopper or other vessel for receiving the meal or other substance to be dried. This hopper sits on a pipe, B, which leads into a heating-chamber, C, and forms within the same a coil, B', issuing therefrom, finally, as an ordinary pipe, and entering the receiving-vessel D. The chamber C is by preference heated by steam, which is let into it through a pipe, $a$, and escapes therefrom through another pipe, $b$.

On the pipe B, near the hopper A, is a branch, $e$, which communicates with a blower for forcing air through the pipe B. The substance to be dried is put into the hopper A, and air is then forced into the branch $e$, and thereby also through the pipe B. This air carries the meal or other substance from the hopper A with it through the heated coil B', and in this heated coil the air will absorb the moisture that is contained in the meal or other substance, and also at the same time constitute the propelling vehicle. The dried result of this process will finally enter the chamber D, while the air charged with moisture passes through a neck, $f$, of that chamber over into another similar chamber, D', and thence by a neck, $f'$, into another chamber, $D^2$, &c., or directly into the air, the object of the chambers D D' $D^2$ being to collect whatever dust may be carried by the escaping air. It is essential that the air which passes through the coil B' should be kept at such a temperature as not to reach the point at which the meal or other substance to be dried, if combustible, would ignite. I have found that good results are obtained by heating it to a temperature of about 150° Fahrenheit, which is less than appears to be needful in any other known process for the like effect.

What I claim is—

The process herein described of drying animal or vegetable matter, which process consists in forcing such matter, by means of a current of air, through a coil which is exposed to heat, substantially as described.

THOS. GEO. WALKER.

Witnesses:
AUGUST SCHLARBAUM,
HARRY M. TURK.